(12) United States Patent
Chari

(10) Patent No.: US 7,929,975 B2
(45) Date of Patent: Apr. 19, 2011

(54) PREQUALIFICATION OF POTENTIAL WIRELESS CUSTOMERS

(75) Inventor: Amalavoyal Chari, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 883 days.

(21) Appl. No.: 11/710,725

(22) Filed: Feb. 26, 2007

(65) Prior Publication Data

US 2008/0207221 A1    Aug. 28, 2008

(51) Int. Cl.
*H04W 24/00*    (2009.01)
(52) U.S. Cl. .................................................. 455/456.1
(58) Field of Classification Search .............. 455/115.1, 455/115.3, 67.11, 226.1, 115.2, 223; 370/241, 370/247, 251; 379/9.03, 201.01, 14, 34–35, 379/133–134, 265, 266, 309, 9, 15, 32.01, 379/33, 9.02
See application file for complete search history.

(56) References Cited

U.S. PATENT DOCUMENTS

| | | | |
|---|---|---|---|
| 6,571,082 B1 * | 5/2003 | Rahman et al. | 455/67.11 |
| 6,674,839 B2 | 1/2004 | Israelski | |
| 6,842,431 B2 | 1/2005 | Clarkson et al. | |
| 6,985,839 B1 | 1/2006 | Monamedi et al. | |
| 7,529,236 B2 * | 5/2009 | Kota et al. | 370/386 |
| 2003/0134648 A1 * | 7/2003 | Reed et al. | 455/456 |
| 2007/0274459 A1 * | 11/2007 | Israelski et al. | 379/9.03 |

* cited by examiner

*Primary Examiner* — Melody Mehrpour
(74) *Attorney, Agent, or Firm* — Brian R Short

(57) ABSTRACT

An apparatus and method of pre-qualifying a potential customer of a wireless network is disclosed. The prequalification includes obtaining a location input by the potential customer, and accessing a wireless network performance database. An expected level of wireless connection performance of the potential customer is estimated based upon the location input by the potential customer, and wireless network performance stored within the network performance database. The expected level of performance is communicated to the potential customer.

20 Claims, 6 Drawing Sheets

PREQUALIFICATION OF POTENTIAL WIRELESS CUSTOMERS

FIELD OF THE INVENTION

The invention relates generally to wireless communications. More particularly, the invention relates to a method and apparatus for pre-qualifying potential wireless customers.

RELATED APPLICATIONS

This patent application is related to patent application Ser. No. 11/638,274, filed on Dec. 13, 2006, and titled "Determining Coverage of a Wireless Network".

BACKGROUND OF THE INVENTION

Wireless mesh networks typically include wired gateways that are wirelessly connected to wireless nodes, or wirelessly connected directly to client devices. Many wireless nodes can collectively form a wireless mesh, in which client devices can associate with any of the wireless nodes.

Wireless networks are typically subjected to environmental influences that make operation of the networks more problematic than wired networks. For example, the wireless links of wireless networks can suffer from fading or multi-path, which degrade the quality of transmission signals traveling through the wireless links. Additionally, wireless networks that include multiple access points can suffer from self-interference.

Once a wireless network has been deployed, a potential customer of the wireless network can not always definitively determine whether or not access to the wireless network is possible. That is, it can be difficult for a potential customer to determine if he/she is physically located with respect to access points of the wireless network, so that connection to the wireless network is possible. Also, due to the previously described potentially problematic nature of wireless connections, it can be difficult for the customer to determine what quality of connection the customer can expect.

It is desirable to have a method and apparatus for pre-qualifying potential wireless network customers. It is desirable that the customer pre-qualification process be easy to access, and provide the customer with an indication of the level of quality of wireless connection the customer should expect. It is additionally desirable to provide the customer with equipment suggestions that can improve the quality of the wireless connection.

SUMMARY OF THE INVENTION

One embodiment of the invention includes a method of pre-qualifying a potential customer of a wireless network. The method includes obtaining a location input by the potential customer, and accessing a wireless network performance database. An expected level of wireless connection performance of the potential customer is estimated based upon the location input by the potential customer, and wireless network performance stored within the network performance database. The expected level of performance is communicated to the potential customer.

Another embodiment includes a method of providing wireless network service and availability information. The method includes collecting network performance data at various locations, and storing the performance data at a server. The server can accept client device location information, and provide expected service and network availability information at a location corresponding with the location information.

Other aspects and advantages of the present invention will become apparent from the following detailed description, taken in conjunction with the accompanying drawings, illustrating by way of example the principles of the invention.

DETAILED DESCRIPTION

Figure 1:
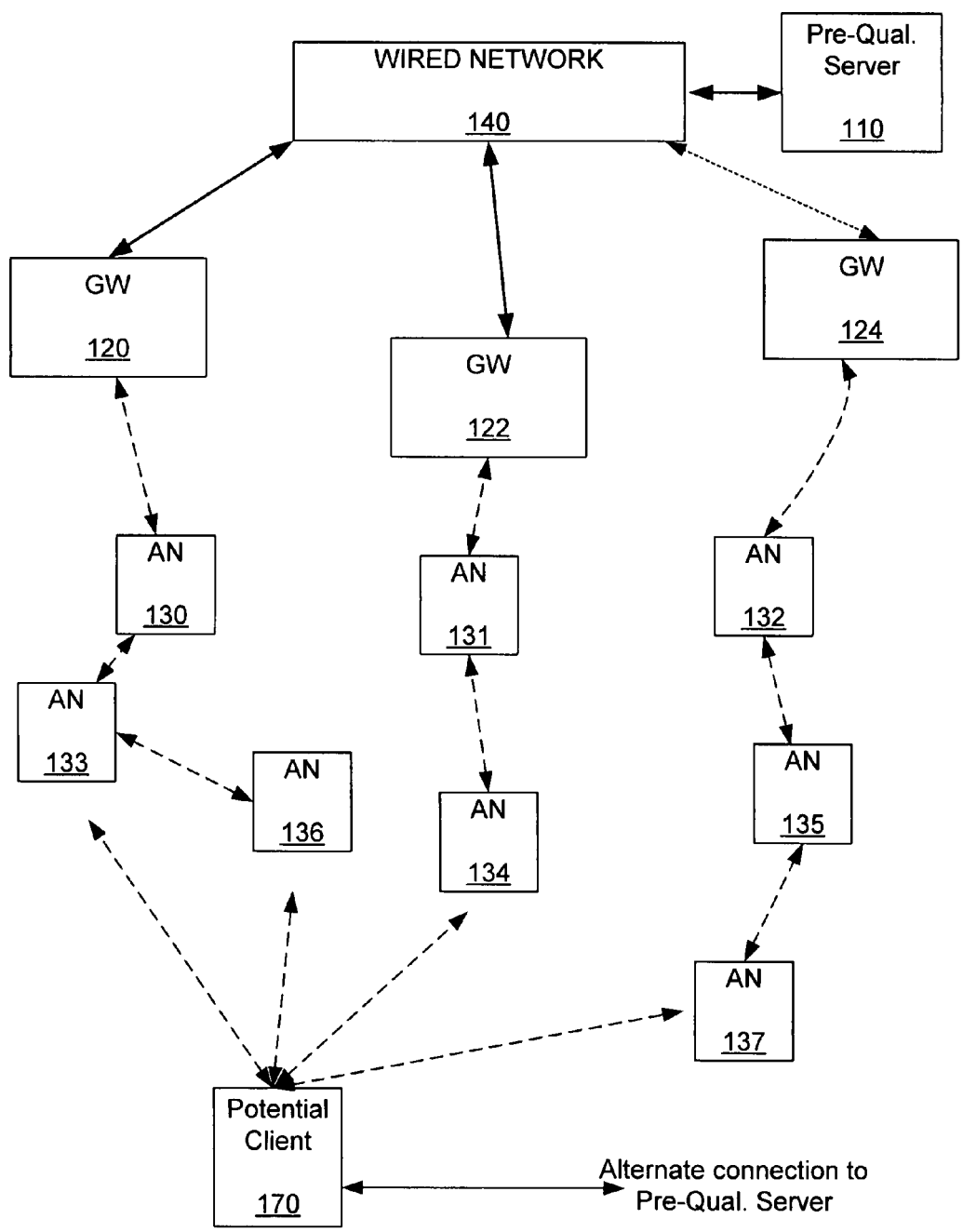
FIG. 1 shows an example of a wireless network that can utilize methods of pre-qualifying potential customers.

As shown in the drawings for purposes of illustration, the invention is embodied in methods for pre-qualifying potential customers of a wireless network. The pre-qualification process can include determining if a wireless connection is available to the potential customer. If a wireless connection is available, the prequalification process can provide the customer (client device user) an indication of an expected quality of the wireless connection. The process can be implemented on a pre-qualification server, allowing the potential customer to easily access the prequalification process. The pre-qualification server can include network information provided by prior characterizations of the network and/or network information (metrics) received from the network itself.

FIG. 1 shows an example of a wireless network that can utilize methods of pre-qualifying potential customers. The wireless network shown in FIG. 1 includes gateways 120, 122, 124 and access nodes 130, 131, 132, 133, 134, 135, 136, 137 that form a wireless mesh network. While the wireless network of FIG. 1 is shown as a wireless mesh network, it is to be understood that the embodiments of customer prequalification described can also be utilized in other types of wireless networks.

The gateways 120, 122, 124 and access nodes 130, 131, 132, 133, 134, 135, 136, 137 can be deployed providing wireless network connections between a client device (such as, a potential client 170) and a wired network 140. The wired network 140 can be connected, for example, to the internet 140, thereby providing the client device with a connection to the internet 140.

Determination of whether a client device can wirelessly connect to one of the gateways 120, 122, 124 or the access nodes 130, 131, 132, 133, 134, 135, 136, 137 of the wireless mesh network is not always readily obvious to a potential customer. Therefore, it is useful for the potential client (customer) 170 to be able to determine whether the potential client 170 is physically located so that a connection is possible.

Once a determination regarding connection has been obtained, the potential customer can decide, for example, whether to subscribe to wireless network services provided by the wireless mesh network.

To determine whether the potential client 170 can obtain a wireless connection to the wireless mesh network, a user (potential customer) of the client device 170 can access a prequalification server 110. The potential customer can access the server, for example, by way of phone, phone connection or any other mode of internet connection. If by phone, the potential customer can call a system operator that can access information of the prequalification server 110, and report back to the potential customer. If the potential customer has internet access though dial-up or any other type of internet connection, such as, DSL or cable (indicated as alternate connection to the Pre-Qual. Server in FIG. 1), the potential customer access the prequalification server through a web-based browser.

The prequalification server 110 includes information about the wireless mesh network that can be used to determine whether the potential client 170 can obtain a wireless connection to the wireless mesh network. Additionally, the prequalification server can estimate the quality of wireless connection available to the potential client 170. Furthermore, the prequalification server 110 can suggest equipment configurations and modifications to the potential client 170 (and to existing client devices) to improve the potential client's wireless connection to the wireless mesh network. The prequalification server 110 can also provide the potential client 170 with estimates of expected wireless connection quality for different suggested equipment modifications.

To make connection determination of potential client device, the prequalification server 110 typically compares the location of the potential client device 170 with locations of access nodes 130, 131, 132, 133, 134, 135, 136, 137 and/or gateways 120, 122, 124 of the wireless network, and/or with locations in which network characterizations have been performed. An estimate of the quality of the connection that the potential client device 170 can be determined based on this comparison.

The information about the wireless network stored within the prequalification server can include network characterization information as will be described. Alternatively, or additionally, the information about the wireless network stored within the prequalification server includes information of wireless mesh network metrics of the access nodes, and of course, the locations of the access nodes. The mesh network metrics can include both performance and utilization metrics.

Figure 2:
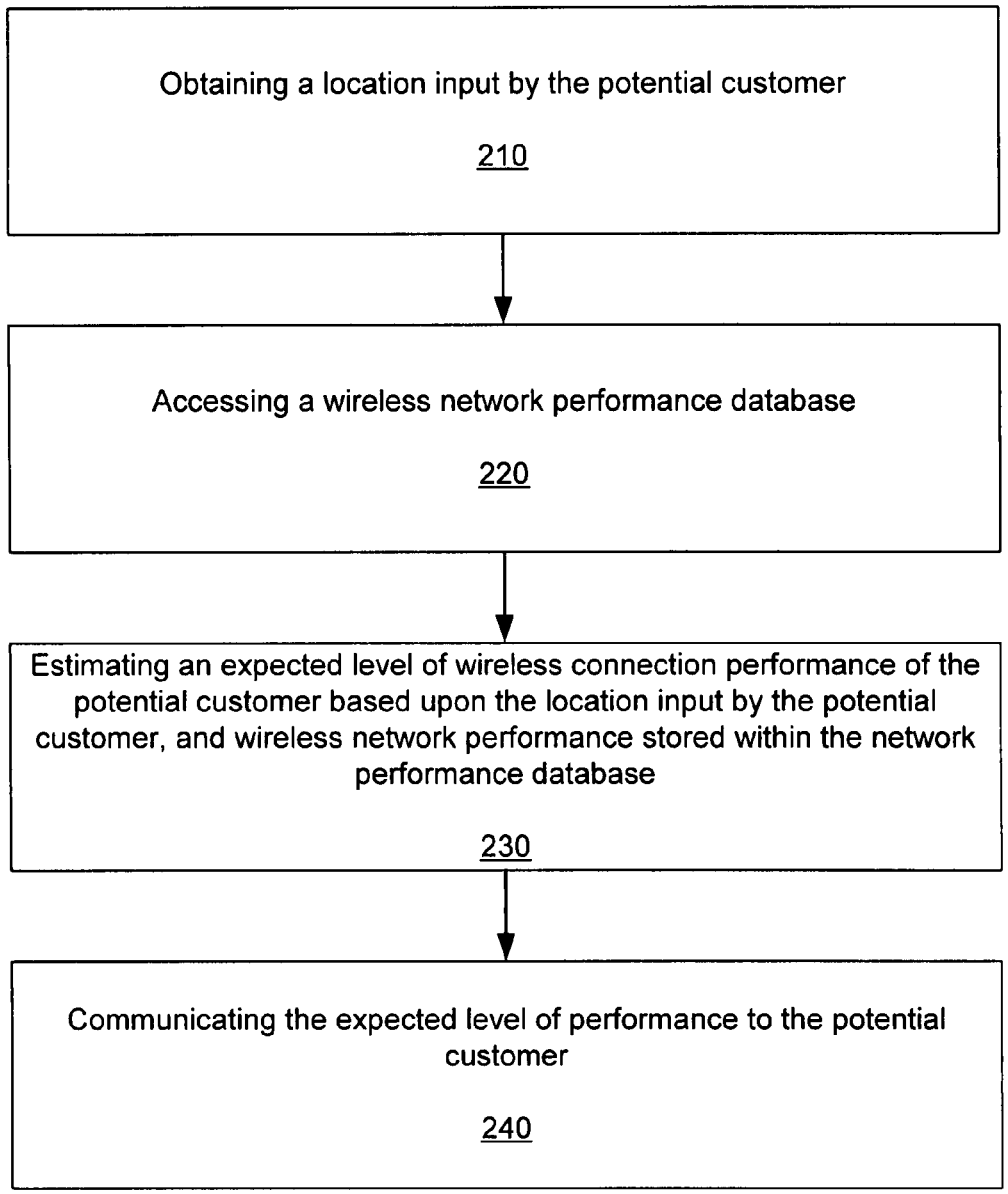
FIG. 2 is a flow chart that includes steps of an embodiment of a method for pre-qualifying potential wireless customers.

FIG. 2 is a flow chart that includes steps of an embodiment of a method for pre-qualifying potential wireless customers. A first step 210 includes obtaining a location input by the potential customer. A second step 220 includes accessing a wireless network performance database. A third step 230 includes estimating an expected level of wireless connection performance of the potential customer based upon the location input by the potential customer, and wireless network performance stored within the network performance database. A fourth step 240 includes communicating the expected level of performance to the potential customer.

As described, for an embodiment, the wireless network performance stored within the network performance database is based on characterizations of the wireless network at multiple locations. The characterizations are of wireless links between a test device and wireless nodes of the wireless network at multiple locations. The information of the characterized links is stored within the wireless network performance database. The links are characterized by measuring wireless link performance between the test device and wireless access nodes of the wireless network. The link performance and the locations in which the measurements are made are stored within the wireless network performance database. Additionally, the locations of the access nodes of the wireless network are stored.

An expected level of wireless connection performance of the client (potential customer) is estimated based upon the location of the client by approximating the expected level of wireless connection performance based on a relative proximity of the location of the inquiring client to the characterized links at the link measurement locations and the wireless access node locations. That is, the based on the locations of the measurements (link characterizations), the locations of the access nodes associated with the links, and based on the location of the client, an estimate of the quality of the wireless connection (wireless link) of the client to the wireless network can be estimated. For example, if a performance measurement within 500 feet of the client's location indicated an achievable throughput of greater than 1 Megabit per second, then the estimate of the quality of the wireless connection of the client estimated as 1 Megabit per second.

Another embodiment includes estimating an expected level of wireless connection performance of the client based upon the location of the client, and analysis of performance data for access nodes proximate to the location of the client. That is, the wireless network can monitor and collect performance metrics of the access nodes of the wireless network. The metrics can include performance metrics and utilization metrics of the access nodes. The previously described prequalification server can receive the performance metrics of the access nodes of the wireless network. Based on the performance metrics of the access nodes, the locations of the access nodes, and the location of the client, the prequalification server can estimate the quality of a wireless connections to the wireless network. The performance data (metrics) of the access nodes can include at least one of a hop count (the number of wireless links away from a gateway for a wireless mesh network), an upstream throughput, a downstream throughput, an air-time utilization, a number of downstream nodes, a number of downstream client devices, of each access node.

It should be understood that the quality of the wireless connection between the client and the wireless network can be based on the characterized link information, the performance metrics of the wireless network, or a combination of the characterized link information and the performance metrics.

Based upon the wireless network performance and the location of the client devices, the expected level of performance of the client can be estimated for different equipment configurations of the client. Exemplary different equipment configurations include at least one of a CPE (consumer premises equipment), directional antenna setting, recommendations for placement of the CPE near a window facing a particular street, recommendations on selection of a channel to configure a CPE or a wireless interface on a client device to, recommendations on configurations of wireless settings on a client device or a CPE, recommendations on the make or vendor of a CPE, etc.

Along with the suggested equipment configurations, the prequalification server can provide the client with an expected level of performance for various equipment configurations.

Figure 3:
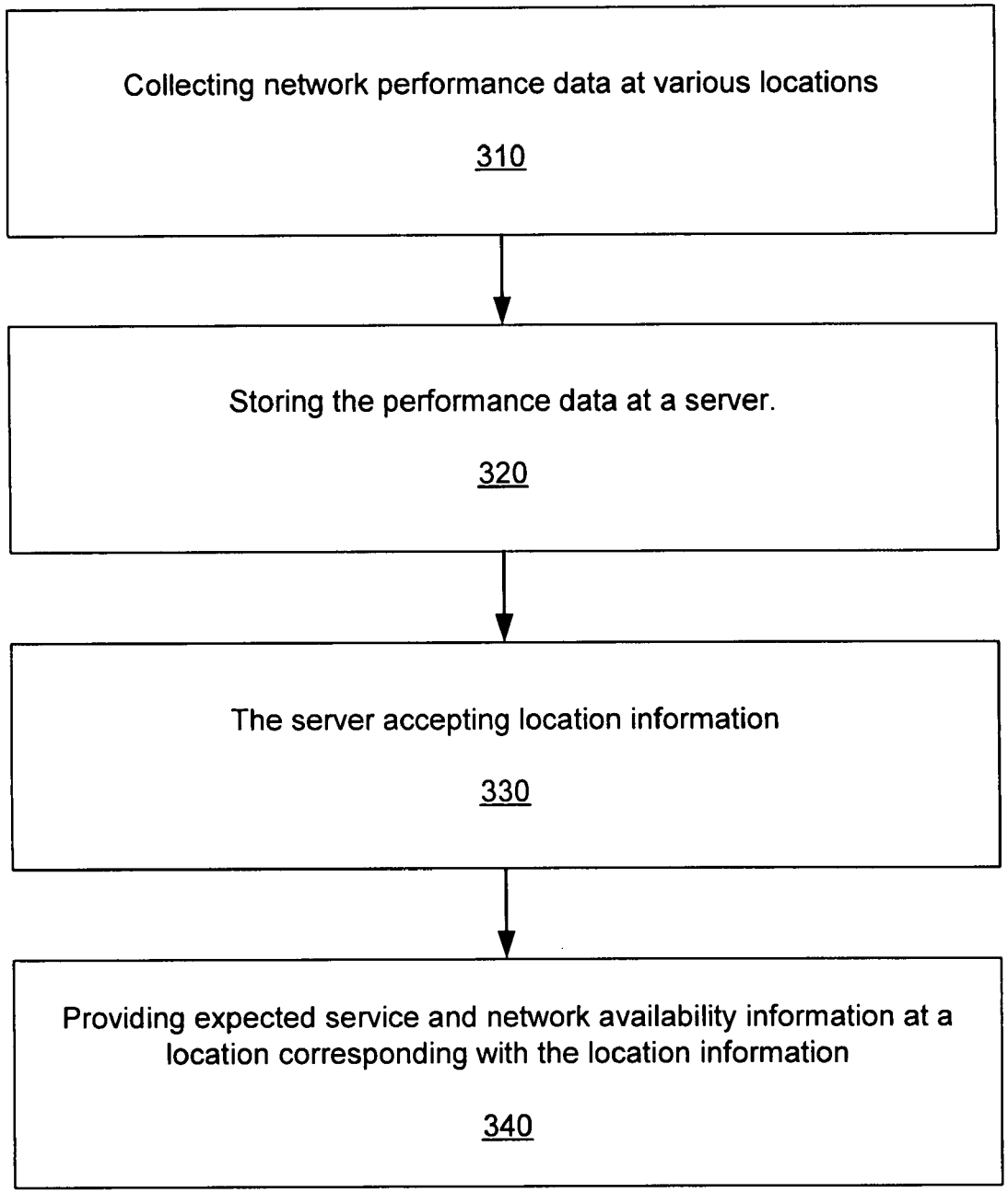
FIG. 3 is a flow chart that includes steps of an embodiment of a method of providing wireless network service and availability information to potential customers that are users of client devices.

FIG. 3 is a flow chart that includes steps of an embodiment of a method of providing wireless network service and availability information to potential customers of client devices. A first step 310 includes collecting network performance data at various locations. A second step 320 includes storing the performance data at a server. A third step 330 includes the server accepting location information. A fourth step 340 providing expected service and network availability information at a location corresponding with the location information.

For an embodiment, the server (for example, the previously described prequalification server) accepts the location through a web browser, and the server provides the expected service and network availability information through the web browser. The web browser is accessible through the internet, and therefore, provides an easy means for a potential customer user of a client device to determine whether the client device can obtain a wireless connection to the wireless network. Additionally, the potential customer can be provided with expected wireless link quality information.

The web browser is accessible and useable by both potential users, and present users. Present users can use the web browser for suggested equipment configurations, and the resulting expectations of performance. Present users can also use the web browser for trouble shooting problematic connections. For an embodiment, the network performance data includes a MAC address and an IP address of access nodes that can be accessed at various different locations as well as any wireless ESSIDs offering service within the area. This information can be used by a client device for determining whether it is able to receive a wireless signal from the access node.

As previously described, the network performance data can include network characterization information, access node locations, and access node performance metrics. The location information for the characterization locations, the access node locations, and the client devices location can all be expressed in latitude and longitude. Based on the location of the client device, connection quality estimates can be made by comparing the client device location with the locations of the characterizations of the wireless network, the locations of the access nodes, and the performance metrics of the access nodes.

An exemplary embodiment includes the server (for example, the prequalification server) accepting a street address input by a potential user or customer. The server converts the street address to a latitude and longitude using, for example, a geo-coding service to translate the street address specification to a latitude and longitude combination. The server then compares the latitude and longitude corresponding to the input street address to latitude and longitude information of the performance data. The server selects at least portions of the performance data based on the latitude and longitude. The server provides the selected portions of performance data corresponding with the location information.

Wireless Network Characterization

Figure 4:
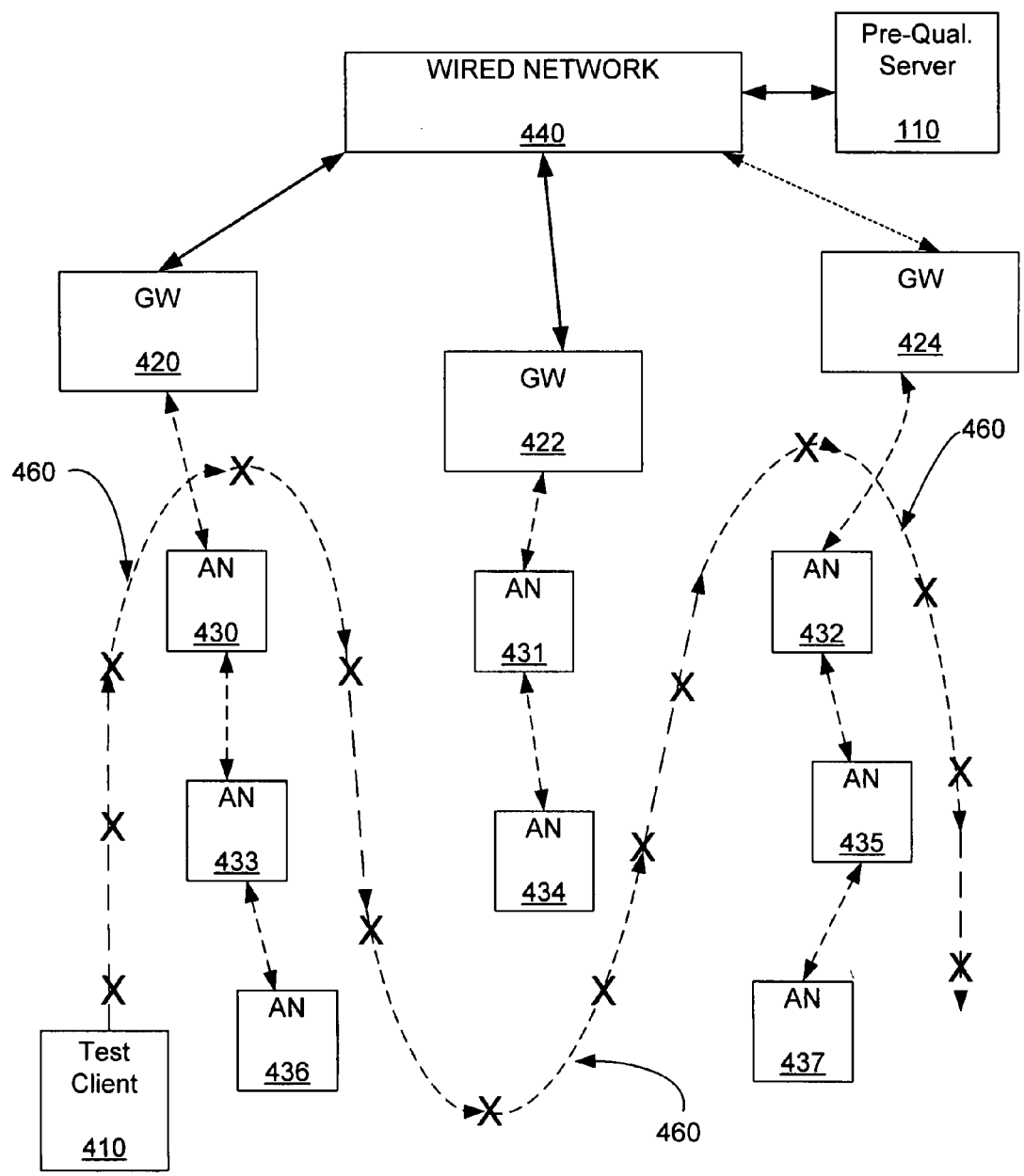
FIG. 4 shows an example of a test device traveling around a wireless mesh network measuring a performance parameter of the wireless mesh network.

FIG. 4 shows a test device 410 traveling around a wireless mesh network, and measuring a performance parameter (such as, transmission data throughput) at various test locations (each location depicted, for example, by an "X") of the wireless mesh network. The test locations shown in FIG. 4 are merely an example of possible test locations. Clearly, more, fewer, or different test locations can be used for characterizing the data throughput of the wireless mesh network. Generally, the more densely clustered the test locations are, the better the characterization of the network.

Client devices (not shown) can wirelessly connect to any of the gateways 420, 422, 424 and access nodes 430, 431, 432, 433, 434, 435, 436, 437, and therefore, obtain access to the wired network 440. As previously described, the wireless links between the gateways, access nodes and client devices, typically suffer from some level of fading, multi-path and interference. The characterizations can be useful in predicting a level of expected performance.

The test client device 410 is used to characterize performance of the wireless network. As shown, the test client device 410 can be included within an automobile, for example, that drives around and within the network while the test client device characterizes network performance. The test client device 410 can travel a path 460, for example, and test performance of the wireless network at the various locations within the wireless mesh network.

The test client device can obtain its location information through a location determination service. The location determination service can be, for example, a global positioning system (GPS). As will be described, the test client device can record its location at each point a network measurement is made. The location information can be retrieved for display of performance of the network.

The described methods of characterizing the wireless network can provide a representation of the coverage of the wireless network. Generally, the coverage of the wireless network can be defined as performance (for example, data throughput) exceeding a pre-determined threshold, and the coverage is the fraction of the area of the network that exceeds the pre-determined threshold.

Characterizing Network Performance

One embodiment includes characterizing the performance of the wireless network by measuring the data throughput at the various locations within the network. The data throughput can provide a better indication of the health of the network than just transmission signal strength.

Testing throughput offers advantages over other performance metrics that can be measured. For example, data throughput measurements account for wireless network limitations such as self-interference, which measuring signal strength does not provide. Transmission signal impairments (such as multi-path and fading) can be reflected in transmission data throughput test. These signal impairments, however, may not be reflected in, for example, a transmission signal strength measurement.

Transmission data throughput tests can be bi-directional tests. That is, the throughput tests can include both the uplink and the downlink between the test client device and the node of the network being tested. Signal strength measurement tests are typically a measurement of signal strength from the test node to the test client device, and do not provide information of transmission quality of the uplink between the test client device and the test node. Additional performance metrics include the latency, round-trip time to a server on the wired network, received SNR and noise levels.

The data packets of throughput tests can be configured to mimic different client applications. Therefore, the performance metric being measured can more accurately reflect the performance of the wireless network for each of the client application types, than a transmission signal strength measurement.

Additionally, transmission data throughput measurements are sensitive to air-time congestion. That is, within a network having many transmitting devices, the air-time available for transmission can become occupied, and can therefore, affect performance of a client connection to the network. Signal strength measurements however, do not reflect the air-time congestion of the network like data throughput measurements.

An embodiment for characterizing the data throughput includes the test client device transmitting a plurality of probe packets at a predetermined rate, and counting a number of responses from the nodes. For an 802.11 wireless network, the test client device transmits probe requests at a predetermined rate, and counts probe responses.

An embodiment includes each of the nodes of the mesh network being configuring with a common IP address. Each of the nodes may have an individual IP address, but additionally have the common IP address that can be used by the test client device for testing the network. Therefore, the test client device does not have to know the address of each node, improving mobility. Additionally, the test client device does not have to reconfigure for testing of each of the nodes.

Types of Client Applications

An embodiment includes determining the data throughput at various locations of the wireless network for multiple types of client applications. For example, client applications can include data, voice, video, streaming data and low demanding applications, such as, automatic meter reading.

The different types of client applications typically have different data types. Therefore, if the wireless network is being used for multiple types of client applications, it is useful to measure the performance parameters, such as, the transmission data throughput using the different data types of the different client applications. Basically, the data packets can be configured to mimic data packets of each of the plurality of client applications.

The different data types can have, for example, different data packet sizes. The size of a packet indicates the number of bit included within the packet, which can vary depending upon the client application. Additionally, the distribution of the data packets can vary. That is, the number of bits within each packet can vary from packet to packet during transmission. Additionally, the data packets can be transmitted at different intervals. That is, the time period between packets or the packets transmitted per second can be adjusted. Different client applications can include different transmission retry processes and age retries differently. Therefore, measuring the performance parameters at different intervals can be useful in characterizing the network for the different client applications.

Network Interference Characterizations

An embodiment includes additionally measuring transmission signal power throughout the wireless network. Based on anomalies between the measured transmission signal power and the measured transmission data throughput, areas of interference can be identified. That is, generally higher power transmission signals can provide a higher transmission data throughput because higher power signals generally have a higher SNR. However, if the transmission signal power is relatively higher, yet the transmission data throughput is relatively lower, it can be assumed that the transmission signal are being subjected to substantial amounts of interference.

Characterizing Multiple Links

An embodiment includes characterizing the data throughput for multiple links. That is, in addition to testing throughput between the client test device and an access node the client device is associated with, the throughput tests can be between the test client device and any end-point device associated with the network, or even outside of the network. As previously shown and described, wireless mesh networks include many devices that can be wired or wirelessly linked. An end-point device can be specified by an address, such as, an IP address. The client test device can exchange data with the end-point device according to the transmission protocol of the client application being tested. In one embodiment, the client test device sends requests to the end-point device, and counts the responses from the end-point device to determine an end-to-end data throughput value.

Presenting Results of the Characterization

Figure 5:
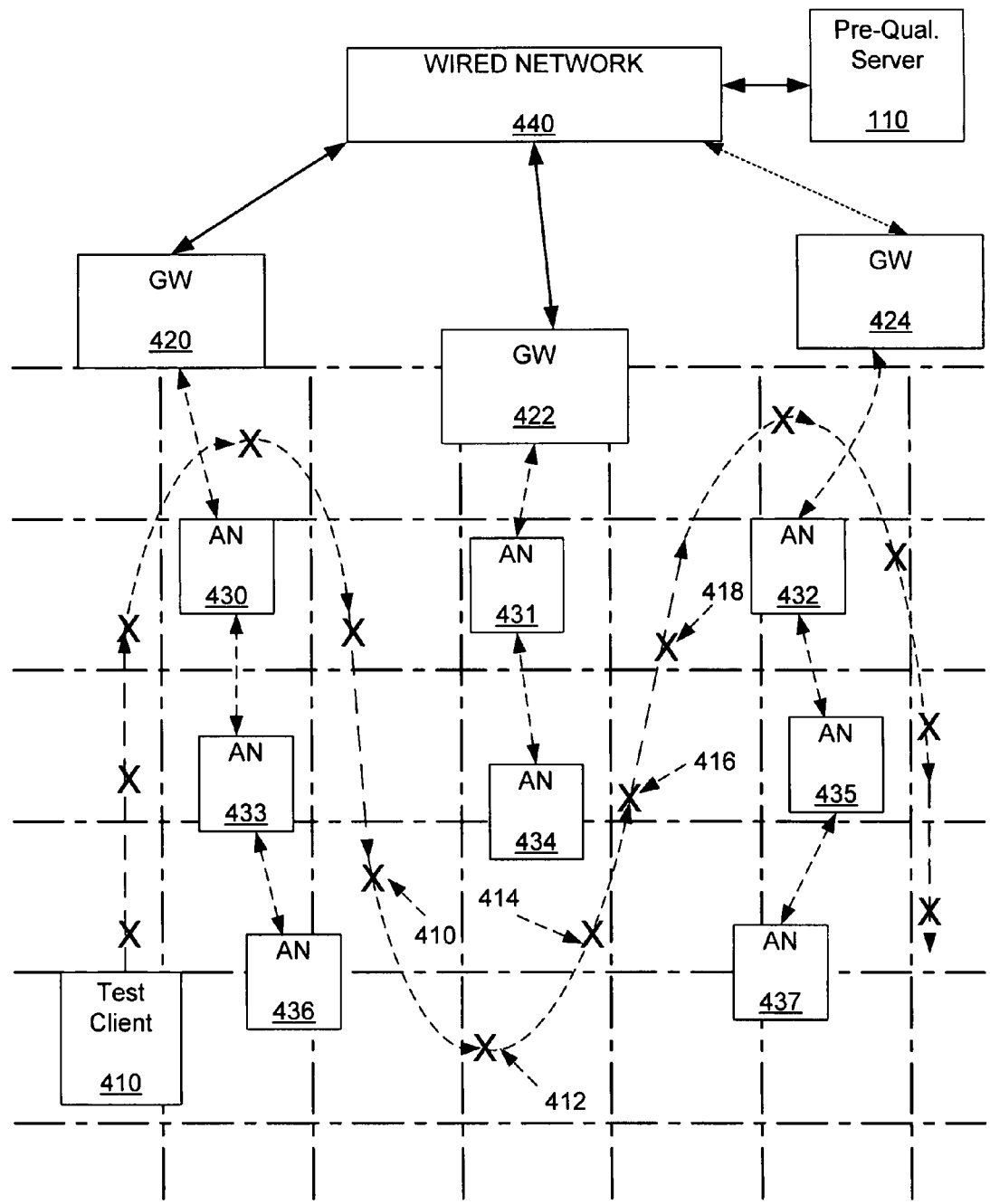
FIG. 5 shows the network of FIG. 4, having been sectored into grids.

An embodiment for reporting the results of the characterization includes dividing (sectoring) an area around the wireless network into grids. Performance of the wireless network within each grid can be estimated based upon, for example, the results of the throughput measurements for each of the client application types. FIG. 5 shows the network of FIG. 4, having been sectored into grids. A value of data throughput for each sector as defined by the grids can be determined based on the data throughput measurements by the test client device. As previously mentioned, the data throughput is characterized at several locations. Based upon the proximity of each of the locations with respect to the areas of the grids, data throughput estimates can be made for each of the grids.

As shown in FIG. 5, transmission data throughput characterized, for example, at test locations 510, 512, 514, 516, 518 can be used to estimate the transmission data throughput in each of the corresponding grid locations or grid points. The accuracy of the characterizations is dependent upon the size of the grids, and the number (density) of the test locations. A grid point (or grid location) can include more than one throughput characterization. A value for the grid point, can therefore, by influenced by more than one characterization location.

The determination of the throughput at each grid location can be determined by several throughput measurements. For one embodiment, measurements that are clearly erroneous are filtered (removed). The mean of the remaining measurements of a grid location can be determined, or an average of the remaining measurements can be used to estimate the throughput at each grid location.

The other measure parameters (for example, latency and jitter) can be estimated at each of the grid locations as well.

A coverage quality of the wireless network can be determined (and therefore, represented) by designating grid points that correspond with locations having a data throughput greater than a threshold as passing grid points, and calculating a percentage wireless network coverage by comparing the passing grid points with a total number of grid points characterized. The resulting percentage can be used to represent the coverage quality of the network.

Additionally, nodes that provide poor performance and nodes that are determined to be impaired, can be identified and recorded. Nodes can be identified as poor performers if, for example, they have a low transmission data throughput or are identified to have a limited transmission range (poor coverage).

Results of the data throughput characterizations can be stored for future access and analysis. For example, the results at each tested location can be stored at in a server that is connected to the network. A network operator can gage the health of the network by accessing the performance parameter measurements. Additionally, potential future users can access the measured parameters to determine a level a quality of connection to the network the potential user could expect.

Figure 6:
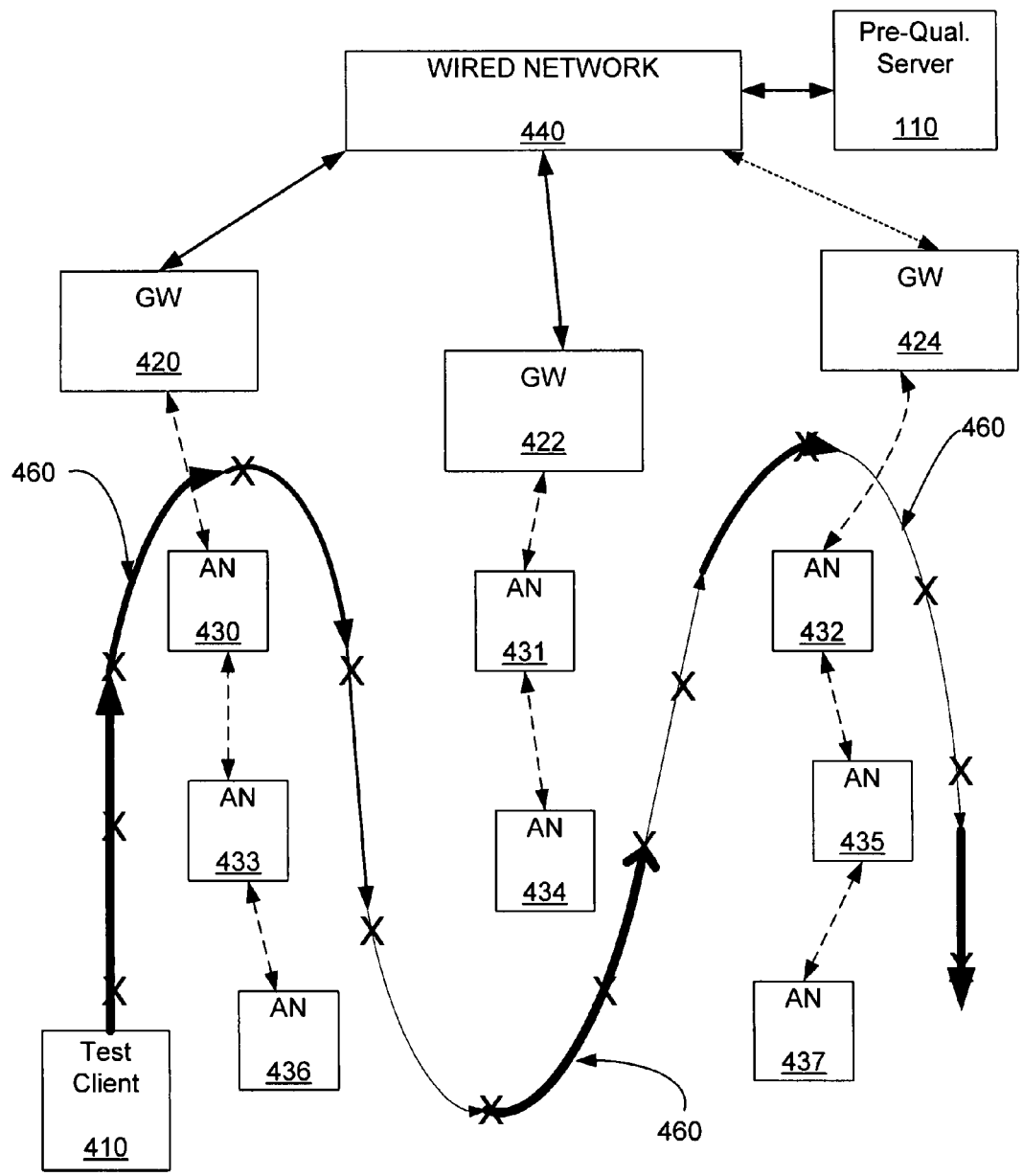
FIG. 6 is a map that shows levels of performance of the wireless network as determined by the methods of characterizing the wireless network.

FIG. 6 is a map that shows levels of performance (as determined by prior measurements of performance parameters) of the wireless network as determined by the methods of measuring performance parameters the wireless network. This map can be useful to a network operator who is analyzing the performance of a network. The network operator can pass the analysis on to a potential customer. Alternately, a customer could access the map through the web browser, and make performance decisions based upon the map.

As shown, the path 660 traveled by the client test device 410 includes varying levels of measured performance. That is, as shown in FIG. 6, the thickness of the path 660 varies depending upon the value of the measured transmission data throughput. The visual depiction on the map of the value of the measured performance metric can be presented in many different ways. For example, the map can include varying colors in which each color represents a predetermined level of measured performance metric. The map can include representations at the points (locations) that measurements were actually made, or the map can additionally fill-in between measurement locations with values that are interpolated from between measured locations.

The map shown in FIG. 6 only shows the measured values over the path 660 in which the measurements were made. However, as described, the map can be filled in between measured values by, for example, interpolating the measured values at the locations of the path 660 in which actual measurements were made. It should be understood that any type of visual depiction can be used as long as different values of performance are distinguishable from each other.

An embodiment includes a real-time display of measured performance metrics. That is, the performance metrics are displayed as they are being measured. The real-time performance metrics can be displayed, for example, by showing the real-time measured performance metrics on a map. The data throughput can be indicated on the map by providing different colors on the map for different levels of data throughput.

Storage and Accessing of the Results of the Characterization

Various embodiments provide methods of storing the characterized data throughput, and subsequently providing characterizations for potential users of the network.

The results of the data throughput characterizations can be stored in a server that potential users of the wireless network can access to determine what level of network connection performance they could expect.

The measurements can be made for the different client applications can be measuring one or more of the measurement parameters while setting the data packets of the transmissions between the client test device and the node being tested according to the protocols of each of the client applications. The can include setting the packet size, packet type and packet interval. The data packets during the measurement attempt to mimic the data packets of the different client types.

Additional measurements, such as, signal strength can also be made and used for determining areas of the wireless network that are suffering from interference, such as, self-interference. These areas can be identified by observing inconsistencies or anomalies between the signal strength measurements and the performance metric measurements.

The performance metrics can be measured for a single link between the client test device and the test node, or for multiple links (wired and wireless) between the client test device and test node.

For presenting the measured performance parameters, an area of the wireless network can be sectored into grid points. Each of the locations is associated with a grid point. Grid points that correspond with locations having a measured performance parameter greater than a threshold can be designated as passing grid points. A percentage of coverage of the wireless network is calculated by comparing the passing grid points with a total number of grid points in which the performance metric was measured. Additionally, poor performing and impaired nodes are identifies and recorded. Poor performing nodes can be identified as nodes that have a lowest data throughput, or provide the least coverage.

The measured performance metrics can be stored for future access and analysis. One embodiment includes generating a database that includes the locations and the measured performance metric. The locations can be either the actual test locations, or the locations can be test locations and locations in which performance metrics are calculated rather than measured.

One method of providing the measured and calculated performance metrics is to visually depict the values of the performance metrics on a map of the area in which the wireless network is located. For example, different levels of performance can be depicted with different colors.

Wireless Network Performance Metrics

As described, for an embodiment, the wireless network performance information includes wireless network performance metrics. The prequalification server, for example, can collect and monitor metrics of the wireless mesh network. The mesh network metrics can include both performance metrics and utilization metrics. The mesh network metrics can be collected by the access nodes and conveyed to the management server.

Examples of performance metrics include access node downstream throughput, upstream throughput, latency and hop count. Downstream throughput is typically defined by the amount of data that can be transferred from the cluster gateway to the access node over a period of time. The upstream throughput is typically defined by the amount of data the access node is able to communication upstream to its cluster's gateway over a period of time. Latency is typically defined as the time required for data to be transmitted from one network location to another location. Latency of an access node is defined as the time taken from the sending of a packet to (or from) the access node from (or to) the cluster's gateway. In a pre-deployment network, these metrics (upstream and downstream throughput and latency) characterize the raw performance of the mesh network. In an operational (post-deployment) network, with data traffic from end-users occupying the mesh links, these metrics characterize the effective network headroom (available capacity in the presence of the existing load).

One embodiment includes the access node determining its downstream and upstream throughput by executing a throughput test between the access node and its cluster's gateway. One embodiment includes a gateway determining downstream and upstream throughputs for access nodes in its cluster by executing throughput tests with each of the access nodes in the cluster as the traffic end-point. The throughput tests can be performed using commercially available throughput measurement tools such as Iperf or nuttcp.

One embodiment includes the access node determining its latency by sending a packet to its cluster's gateway, receiving a packet from the gateway in response, measuring the interval between transmission of the first packet and reception of the second packet and halving this round-trip time to determine a one-way delay or latency.

Examples of utilization metrics include data traffic through the access node, air-time utilization at the access node, a number of downstream routers of the access node, and a number of downstream clients of the access node. Air-time utilization is typically defined by the fraction of time that the channel is sensed as being busy. The channel can be busy for a variety of reasons including the medium being busy because of other transmissions being in progress, external radio frequency interference, etc. Carrier-sense multiple access (CSMA) as employed in the 802.11 standard requires an access node to refrain from transmitting if the medium is sensed as being busy. One embodiment includes determining the air-time utilization of the access node by measuring the fraction of time that the medium is sensed as being busy, averaged over some time-scale. The number of downstream access nodes and downstream clients can be determined from the previously described routing tables.

Based on the mesh network metrics, intelligent decisions of which access nodes to convert to gateways can be made. Each access node can monitor its mesh network metrics. The mesh network metrics can be reported to a network server, such as, the prequalification server 110.

Prequalification Server Computer Program

An embodiment of the method of customer prequalification is a computer program. The computer program is operable on a server (for example, the prequalification server) of a wireless mesh network. When executed, the program is operable to cause the server accept a street address, convert the street address to a latitude and longitude, compare the latitude and longitude to latitude and longitude information of performance data of a performance database, select at least portions of the performance data based on the latitude an longitude, provide the selected portions of performance data corresponding with the location information.

Although specific embodiments of the invention have been described and illustrated, the invention is not to be limited to the specific forms or arrangements of parts so described and illustrated. The invention is limited only by the appended claims.

What is claimed:

1. A method of pre-qualifying a potential customer of a wireless network comprising:
   obtaining a location input by the potential customer;
   accessing a wireless network performance database;
   estimating an expected level of wireless connection performance of the potential customer based upon the location input by the potential customer, and wireless network performance stored within the network performance database;
   communicating the expected level of performance to the potential customer.

2. The method of claim 1, wherein the wireless network performance stored within the network performance database is based on characterizations of the wireless network at multiple locations.

3. The method of claim 2, further comprising characterizing the wireless network performance, comprising:
   characterizing wireless links between a test device and wireless nodes of the wireless network at multiple locations;
   storing information of the characterized links within the wireless network performance database.

4. The method of claim 3, wherein characterizing wireless links between a test device and wireless nodes of the wireless network comprises measuring wireless link performance between the test device and wireless access nodes of the wireless network.

5. The method of claim 4, wherein characterizing wireless links between a test device and wireless nodes of the wireless network further comprises storing link measurement locations and wireless access node locations in the wireless network performance database.

6. The method of claim 5, wherein estimating an expected level of wireless connection performance of the potential customer based upon the location input by the potential customer comprises approximating the expected level of wireless connection performance based on a relative proximity of the location of the potential customer to the characterized links at the link measurement locations and the wireless access node locations.

7. The method of claim 6, wherein estimating an expected level of wireless connection performance of the potential customer based upon the location input by the potential customer further comprises analyzing performance data for access nodes proximate to the location input by the potential customer.

8. The method of claim 1, wherein the wireless network performance stored within the network performance database is based on performance data of access nodes of the wireless network, and locations of the access nodes of the wireless network.

9. The method of claim 8, wherein performance data for the access nodes comprises at least one of a hop count, an upstream throughput, a downstream throughput, an air-time utilization, a number of downstream nodes, a number of downstream client devices, of each access node.

10. The method of claim 1, further comprising:
    estimating the expected level of performance of the potential customer for different equipment configurations of a client device of the potential customer.

11. The method of claim 10, wherein the different equipment configurations comprise at least one of a CPE, directional antenna, CPE placement recommendations, CPE transmission channel selection.

12. The method of claim 1, further comprising suggesting equipment configurations to an existing client device to improve connectivity of the client device to the wireless network.

13. The method of claim 11, further comprising providing a customer of the existing client device with an expected level of performance for various equipment configurations.

14. A method of providing wireless network service and availability information, comprising:
    collecting expected level of wireless connection performance data at various locations;
    storing the expected level of wireless connection performance data at a server;
    the server accepting location information; and
    providing expected service and network availability information at a location corresponding with the location information.

15. The method of claim 13, wherein the server accepts the location information through a web browser, and the server provides the expected service and network availability information through the web browser.

16. The method of claim 13, wherein the expected level of wireless connection performance data comprises downstream throughput and upstream throughput of the wireless network for various locations.

17. The method of claim 13, wherein the expected level of wireless connection performance data comprises at least one of MAC addresses, IP addresses of access nodes or ESSIDs supported on access nodes that can be accessed at various different locations.

18. The method of claim 13, wherein the expected level of wireless connection performance data comprises access node information and wireless connection quality at various latitudes and longitudes.

19. The method of claim 13, wherein the expected level of wireless connection performance data comprises latitude and longitude information of access nodes of the wireless network proximate to the location corresponding to the location information.

20. The method of claim 13, wherein the server accepting location information, and
  providing expected service and network availability information at a location corresponding with the location information, comprises:
    the server accepting a street address;
    the server converting the street address to a latitude and longitude;
    the server comparing the latitude and longitude to latitude and longitude information of the performance data;
    selecting at least portions of the performance data based on the latitude an longitude;
    providing the selected portions of performance data corresponding with the location information.

* * * * *